(12) United States Patent
Tao

(10) Patent No.: US 8,929,457 B2
(45) Date of Patent: Jan. 6, 2015

(54) SYSTEM AND METHOD FOR REPLACING BITSTREAM SYMBOLS WITH INTERMEDIATE SYMBOLS

(75) Inventor: Olive Tao, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 2463 days.

(21) Appl. No.: 10/374,846

(22) Filed: Feb. 25, 2003

(65) Prior Publication Data

US 2004/0179607 A1    Sep. 16, 2004

(51) Int. Cl.
| | | |
|---|---|---|
| H04N 7/12 | (2006.01) |
| H04N 19/70 | (2014.01) |
| H04N 19/00 | (2014.01) |
| H04N 19/159 | (2014.01) |
| H04N 19/40 | (2014.01) |
| H04N 19/46 | (2014.01) |

(52) U.S. Cl.
CPC ......... *H04N 19/00884* (2013.01); *H04N 19/00* (2013.01); *H04N 19/00218* (2013.01); *H04N 19/00472* (2013.01); *H04N 19/00545* (2013.01)
USPC .................................................... 375/240.25

(58) Field of Classification Search
USPC ................. 375/240, 240.01, 240.12, 240.25; 348/423.1
See application file for complete search history.

(56) References Cited

U.S. PATENT DOCUMENTS

| | | | | |
|---|---|---|---|---|
| 5,614,952 A | * | 3/1997 | Boyce et al. | 375/240.01 |
| 5,847,767 A | * | 12/1998 | Ueda | 348/423.1 |
| 6,327,304 B1 | * | 12/2001 | Miller et al. | 375/240.12 |

* cited by examiner

*Primary Examiner* — Allen Wong
(74) *Attorney, Agent, or Firm* — Foley & Lardner LLP

(57) ABSTRACT

A system, method, and apparatus for decoding a bitstream are presented herein. Symbols in the bitstream are replaced with intermediate symbols by a preprocessor. In a video decoder, a video decompression engine is used to provide decoded frames at a constant rate. However, the frames are encoded as pictures with widely varying amounts of data in a bitstream. A preprocessor replaces symbols with intermediate symbols providing the same information in a different format. The intermediate symbols are preferably simpler for decoding.

15 Claims, 5 Drawing Sheets

SYSTEM AND METHOD FOR REPLACING BITSTREAM SYMBOLS WITH INTERMEDIATE SYMBOLS

RELATED APPLICATIONS

Federally Sponsored Research or Development

[Not Applicable]

MICROFICHE/COPYRIGHT REFERENCE

[Not Applicable]

BACKGROUND OF THE INVENTION

A video sequence includes a series of images represented by frames. The frames comprise two-dimensional grids of pixels. An exemplary video sequence, such as a video sequence in accordance with the ITU-656 standard, includes 30 720×480 pixel frames per second. The foregoing results in a bit rate of approximately 165 Mbps for a video sequence.

Multiple video sequences are transmitted together on a communication medium such as a coaxial cable, for example, using a multiple access scheme. The multiple access scheme can include, for example, frequency division multiple access (FDMA), or time division multiple access (TDMA). In a multiple access scheme, each video sequence is associated with a particular channel. As the number of video sequences which are transmitted increases, the bandwidth requirements for the communication medium are further increased.

Accordingly, a number of data compression standards have been promulgated to alleviate bandwidth requirements. One such standard known as Advanced Video Coding (AVC) was developed by the Joint Video Team (JVT) project of the International Organization for Standardization (ISO) and the International Telecommunication Union.

The AVC standard uses a number of techniques to compress video streams, such as motion-based compensation to reduce temporal redundancy. The AVC standard encodes each frame using three main picture types—intra-coded pictures (I-pictures), inter-coded pictures (P-pictures), and Bi-predictive (B-pictures). I-pictures are coded without reference to other pictures and can provide access points to the coded sequence where decoding can begin, but are coded with only moderate compression. P-pictures are coded more efficiently using motion compensation prediction of each block of sample values from some previously decoded picture selected by the encoder. B-pictures provide the highest degree of compression but require a higher degree of memory access capability in the decoding process, as each block of sample values in a B-picture may be predicted using a weighted average of two blocks of motion-compensated sample values.

Motion-based compensation results in varying degrees of compression for the pictures forming the video sequence. Conversely, the pictures are encoded by varying amounts of data. For example, I-pictures tend to require the largest amount of bits for encoding, while B-pictures require the least amount of bits for encoding.

At the decoder, uniform length frames, e.g., 720×480 pixels, are displayed at a constant rate. In order to display the video sequence in real-time, each picture must be decoded in uniform lengths of time, to at least some degree. Therefore, pictures with a large number of bits require a much higher decoding rate than the average decoding rate which can be inferred from the transmission bit rate and the display bit rate. In some cases, the peak decoding rate required for displaying video sequences in real time can be as high as 750-1000 Mbps even if the transmitted video data rate is much lower, such as 1 to 10 Mbps.

Further limitations and disadvantages of conventional and traditional approaches will become apparent to one of skill in the art, through comparison of such systems with embodiments of the present invention as set forth in the remainder of the present application.

BRIEF SUMMARY OF THE INVENTION

A system, method, and apparatus for decoding a bitstream is presented herein. Symbols in the bitstream are replaced with intermediate symbols by a preprocessor. In a video decoder, a video decompression engine is used to provide decoded frames at a constant rate. However, the frames are encoded as pictures with widely varying amounts of data in a bitstream. A preprocessor replaces symbols with intermediate symbols providing the same information in a different format. The intermediate symbols are preferably simpler for decoding.

These and other advantages and novel features of the present invention, as well as details of an illustrated embodiment thereof, will be more fully understood from the following description and drawings.

DETAILED DESCRIPTION OF THE INVENTION

Figure 1:
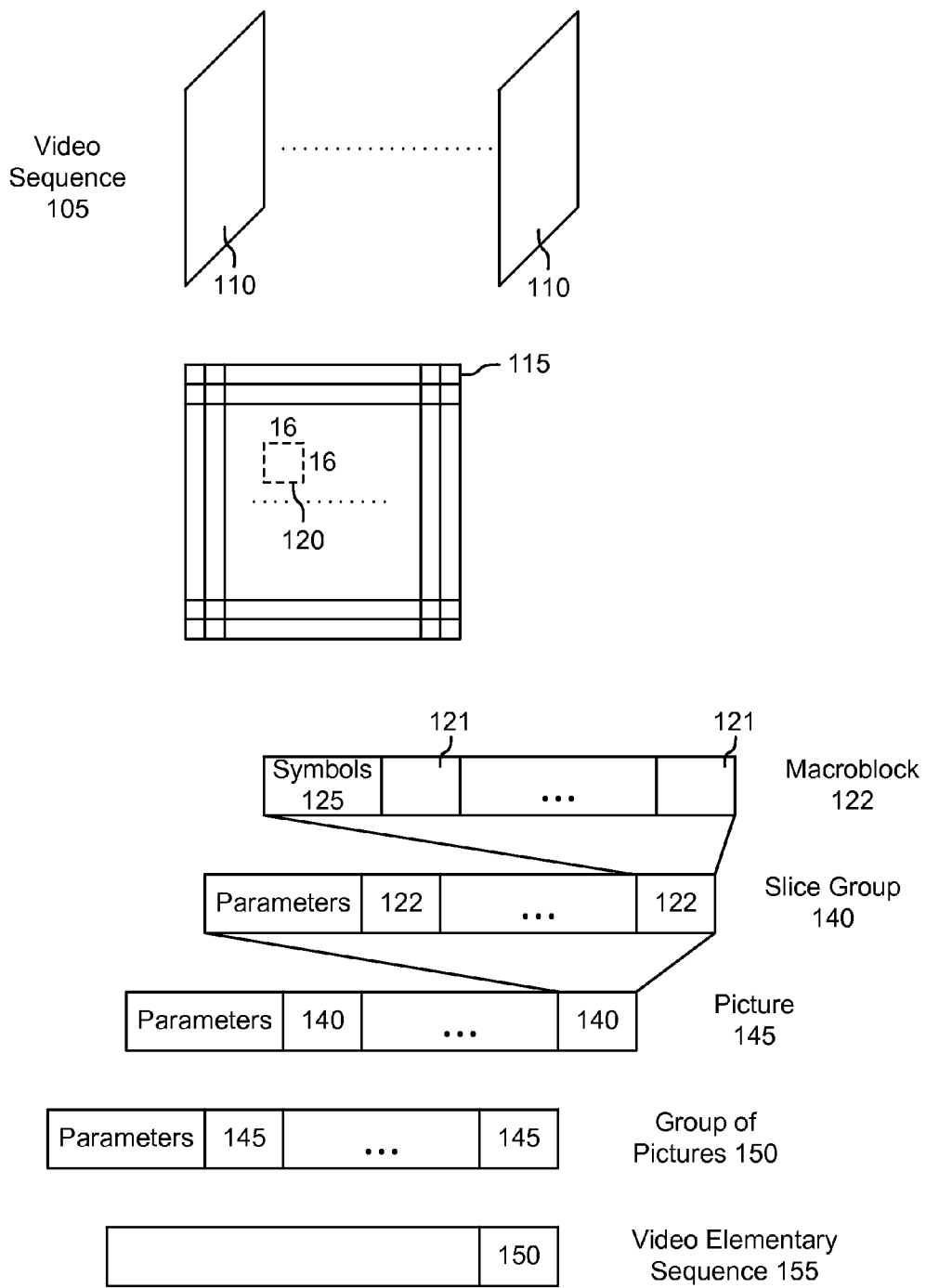
FIG. 1 is a block diagram describing AVC formatting of a video sequence.

Referring now to FIG. 1, there is illustrated a block diagram describing AVC formatting of a video sequence 105. A video sequence 105 comprises a series of frames 110. In a progressive scan, the frames 110 represent instantaneous images, while in an interlaced scan, the frames 110 comprises two fields each of which represent a portion of an image at adjacent times. Each frame comprises a two dimensional grid of pixels 115. The two-dimensional grid of pixels are divided into groups of 16×16 pixels 120.

The groups of 16×16 pixels 120 are represented by a set of blocks 121. The blocks 121 form the data portion of a data structure known as a macroblock 122. The macroblock 122 also comprises macroblock symbols 125 indicating various parameters. The symbols indicate parameters with the following syntax:

MB_TYPE [SUB_MB_TYPE (4)] [REF_ID_L0 (1~4)] [REF_ID_L1 (1~4)] [MVD_L0) (1~16)×2 MVD_L1 (1~16)×2] [CODED_BLOCK_PATTERN] [MB_QP_DELTA] [MB RESIDUAL]

The macroblock 122 is grouped into different slice groups 140. The slice group 140 includes the macroblocks 122, as well as additional parameters describing the slice group. Each of the slice groups 140 forming the frame form the data portion of a picture 145. The picture 145 includes the slice groups 140 as well as additional parameters. The pictures 145 are then grouped together as a group of pictures 150. The group of pictures 150 also includes additional parameters. Groups of pictures 150 are then stored, forming what is known as a video elementary sequence 155.

The AVC standard uses a number of techniques to compress video streams, such as motion-based compensation to reduce temporal redundancy. The AVC standard encodes each frame using three main picture types—intra-coded pictures (I-pictures), interceded pictures (P-pictures) and bi-predictive pictures (B-pictures). I-pictures are encoded without reference to other pictures. P-pictures are coded more efficiently using motion compensation prediction from a previous picture. B-pictures provide the highest degree of compression using motion compensation prediction from both a previous and subsequent frame.

Motion-based compensation results in varying degrees of compression for the pictures forming the video sequence. Conversely, the pictures are encoded by varying amounts of data. For example, I-pictures tend to require the largest amount of bits for encoding, while B-pictures require the least amount of bits for encoding.

The pictures 145 are decompressed forming uniform length frames that are displayed at a constant rate. In order to display the video sequence in real-time, each picture must be decoded in uniform lengths of time, to at least some degree. Therefore, pictures with a large number of bits require a much higher decoding rate than the average decoding rate which can be inferred from the transmission bit rate and the display bit rate. In some cases, the peak decoding rate required for displaying video sequences in real time can be as high as 750-1000 Mbps even if the transmitted video data rate is much lower, such as 1 to 10 Mbps.

Aspects of the present invention propose alleviation of the foregoing peak decoding rate by preprocessing the bitstream, prior to the point where decoding is in synchronization with a display device. The preprocessor extracts the symbols from the macroblock and replaces the symbols with intermediate symbols. The intermediate symbols are preferably simpler for decoding, thereby simplifying decompression of the compressed data.

Figure 2:
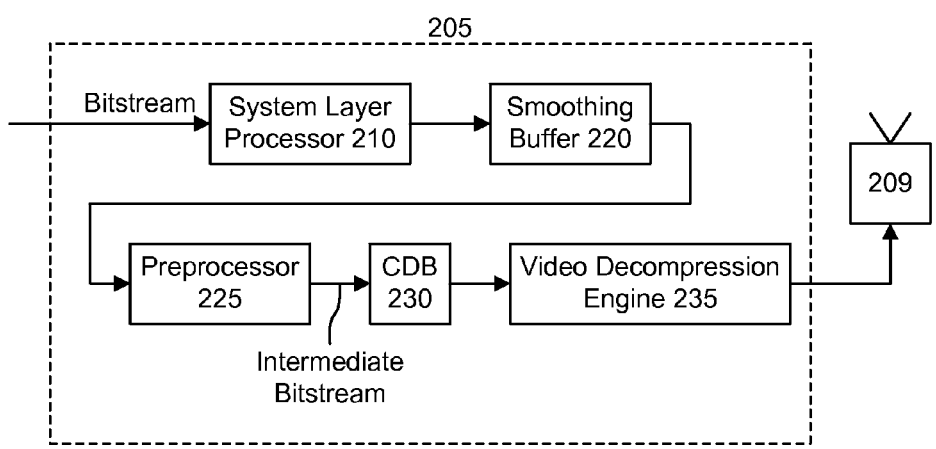
FIG. 2 is a block diagram of an exemplary decoder in accordance with an embodiment of the present invention.

Referring now to FIG. 2, there is illustrated a block diagram of an exemplary decoder 205 in accordance with an embodiment of the present invention. The decoder 205 receives and decompresses a bitstream, thereby resulting in a video sequence. The video sequence comprises frames that are provided to, and in synchronization with, a display device 209.

The video sequence is provided to the display device by a video decompression engine 235 within the decoder 205. The video decompression engine 235 decompresses the video data in synchronization with a display device 210. The bitstream is received at rates that may vary from 2-20 Mbps in a typical application.

However, the pictures of the bitstream comprise widely varying amounts of data. Pictures with a large number of bits require a much higher decoding rate than the average decoding rate which can be inferred from the transmission bit rate and the display bit rate.

To ease the processing requirements of the video decompression engine 235, the macroblock symbols 125 in the bitstream are replaced with parameters that are less complex to decode. The bitstream is received by a system layer processor 210. The system layer processor 210 parses the system layer, extracting any system layer information that may be necessary for decoding and display.

The output of the system layer processor is a bitstream comprising video elementary stream data. The bitstream can be written to a smoothing buffer 220. The smoothing buffer 220 may be implemented as a Static Random Access Memory (SRAM) on-chip or as a region of Dynamic Random Access Memory (DRAM) off-chip, or other memory design. The smoothing buffer 220 stores the data temporarily and smoothes the data rate.

A preprocessor 225 replaces the macroblock symbols 125 with intermediate symbols. The intermediate symbols are preferably easier to decode. The bitstream and the intermediate symbols, now referred to as the intermediate bitstream, are stored in a compressed data buffer 230.

The video decompression engine 235 receives the intermediate bitstream by reading the compressed data buffer 230. The video decompression engine 235 decompresses the intermediate bitstream, thereby generating video sequence. Additionally, the video decompression engine 235 generates the video sequence in synchronization with the display unit 209. The video decompression engine 235 is able to decompress the intermediate bitstream to generate the video sequence in synchronization with the display unit 209 because the intermediate bitstream is encoded in a format that is simpler to decode. The decoder can also include buffers and other devices common in video decoders. Details of such devices are well known and are omitted for the sake of clarity.

Figure 3:
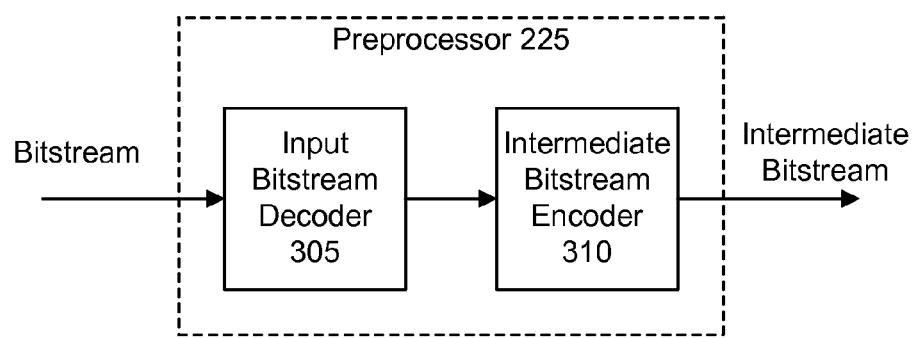
FIG. 3 is a block diagram of an exemplary preprocessor in accordance with an embodiment of the present invention.

Referring now to FIG. 3, there is illustrated a block diagram of an exemplary preprocessor 225 for replacing macroblock symbols 125 with intermediate symbols. The preprocessor 225 comprises an input bitstream decoder 305 and an intermediate bitstream encoder 310. The input bitstream decoder 305 receives the bitstream and decodes the macroblock symbols 125, thereby generating a decoded set of symbols. The input bitstream decoder 305 provides the decoded macroblock symbols 125 to the input bitstream encoder 310. The input bitstream encoder 310 recovers the value of each decoded macroblock symbol and encodes the value. The foregoing results in an intermediate bitstream. The input bitstream encoder 310 outputs the intermediate bitstream and preferably writes the intermediate bitstream into a memory such as the compressed data buffer 230.

Figure 4:
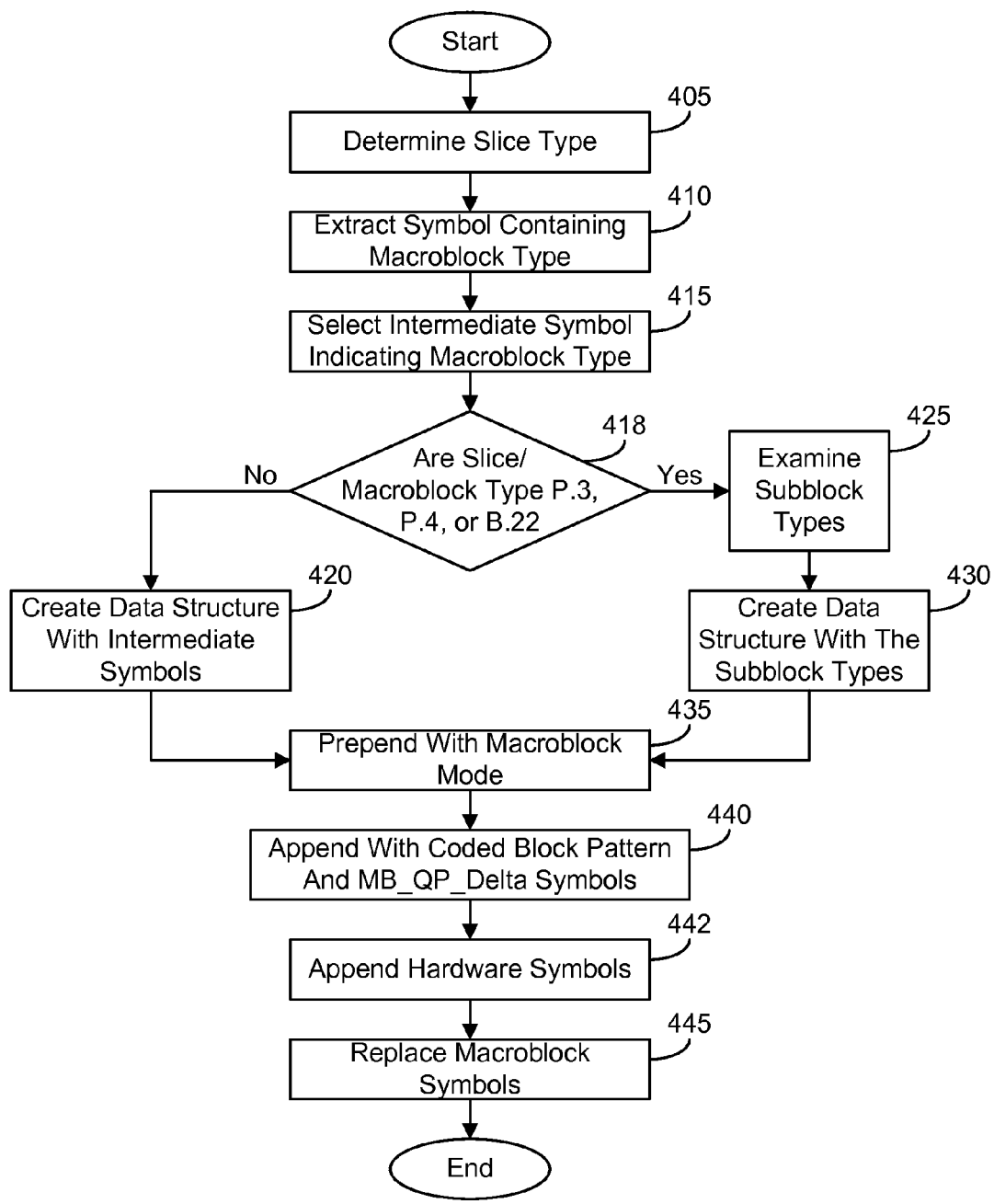
FIG. 4 is a flow diagram describing the operation of the preprocessor in accordance with an embodiment of the present invention.

Referring now to FIG. 4, there is illustrated a flow diagram describing the operation of the preprocessor 225 in accordance with an embodiment of the present invention. At 405, the preprocessor determines whether a macroblock is associated with an I-slice, a P-slice, or a B-slice. At 410, the preprocessor extracts the symbol indicating the macroblock type. At 415, the preprocessor selects intermediate symbols associated with the symbol indicating the macroblock type. An exemplary table associating symbols indicating different macroblock types to intermediate symbols indicating prediction and block types is illustrated below:

| mb_type | Name of mb_type | mb_part_pred_mode (mb_type, 0) | Intra 6 × 16 PredMode | CodedBlock PatternChroma | CodedAC PatternLuma |
|---|---|---|---|---|---|
| 0 | I_4 × 4 | Intra_4 × 4 | na | na | na |
| 1 | I_16 × 16_0_0_0 | Intra_16 × 16 | 0 | 0 | 0 |
| 2 | I_16 × 16_1_0_0 | Intra_16 × 16 | 1 | 0 | 0 |

-continued

| mb_type | Name of mb_type | mb_part_pred_mode (mb_type, 0) | Intra 6 × 16 PredMode | CodedBlock PatternChroma | CodedAC PatternLuma |
|---|---|---|---|---|---|
| 3 | I_16×16_2_0_0 | Intra_16×16 | 2 | 0 | 0 |
| 4 | I_16×16_3_0_0 | Intra_16×16 | 3 | 0 | 0 |
| 5 | I_16×16_0_1_0 | Intra_16×16 | 0 | 1 | 0 |
| 6 | I_16×16_1_1_0 | Intra_16×16 | 1 | 1 | 0 |
| 7 | I_16×16_2_1_0 | Intra_16×16 | 2 | 1 | 0 |
| 8 | I_16×16_3_1_0 | Intra_16×16 | 3 | 1 | 0 |
| 9 | I_16×16_0_2_0 | Intra_16×16 | 0 | 2 | 0 |
| 10 | I_16×16_1_2_0 | Intra_16×16 | 1 | 2 | 0 |
| 11 | I_16×16_2_2_0 | Intra_16×16 | 2 | 2 | 0 |
| 12 | I_16×16_3_2_0 | Intra_16×16 | 3 | 2 | 0 |
| 13 | I_16×16_0_0_1 | Intra_16×16 | 0 | 0 | 1 |
| 14 | I_16×16_1_0_1 | Intra_16×16 | 1 | 0 | 1 |
| 15 | I_16×16_2_0_1 | Intra_16×16 | 2 | 0 | 1 |
| 16 | I_16×16_3_0_1 | Intra_16×16 | 3 | 0 | 1 |
| 17 | I_16×16_0_1_1 | Intra_16×16 | 0 | 1 | 1 |
| 18 | I_16×16_1_1_1 | Intra_16×16 | 1 | 1 | 1 |
| 19 | I_16×16_2_1_1 | Intra_16×16 | 2 | 1 | 1 |
| 20 | I_16×16_3_1_1 | Intra_16×16 | 3 | 1 | 1 |
| 21 | I_16×16_0_2_1 | Intra_16×16 | 0 | 2 | 1 |
| 22 | I_16×16_1_2_1 | Intra_16×16 | 1 | 2 | 1 |
| 23 | I_16×16_2_2_1 | Intra_16×16 | 2 | 2 | 1 |
| 24 | I_16×16_3_2_1 | Intra_16×16 | 3 | 2 | 1 |

| mb_type | Name of mb_type | num_mb_part (mb_type) | mb_part_pred_mode (mb_type, 0) | mb_part_pred_mode (mb_type, 0) |
|---|---|---|---|---|
| 0 | P_L0_16×16 | 1 | Pred_L0 | na |
| 1 | P_L0_L0_16×8 | 2 | Pred_L0 | Pred_L0 |
| 2 | P_L0_L0_8×16 | 2 | Pred_L0 | Pred_L0 |
| 3 | P_8×8 | 4 | na | na |
| 4 | P_8×8ref0 | 4 | na | na |

| mb_type | Name of mb_type | num_mb_part (mb_type) | mb_part_pred_mode (mb_type, 0) | mb_part_pred_mode (mb_type, 1) |
|---|---|---|---|---|
| 0 | B_Direct_16×16 | 1 | Direct | na |
| 1 | B_L0_16×16 | 1 | Pred_L0 | na |
| 2 | B_L1_16×16 | 1 | Pred_L1 | na |
| 3 | B_Bi_16×16 | 1 | BiPred | na |
| 4 | B_L0_L0_16×8 | 2 | Pred_L0 | Pred_L0 |
| 5 | B_L0_L0_8×16 | 2 | Pred_L0 | Pred_L0 |
| 6 | B_L1_L1_16×8 | 2 | Pred_L1 | Pred_L1 |
| 7 | B_L1_L1_8×16 | 2 | Pred_L1 | Pred_L1 |
| 8 | B_L0_L1_16×8 | 2 | Pred_L0 | Pred_L1 |
| 9 | B_L0_L1_8×16 | 2 | Pred_L0 | Pred_L1 |
| 10 | B_L1_L0_16×8 | 2 | Pred_L1 | Pred_L0 |
| 11 | B_L1_L0_8×16 | 2 | Pred_L1 | Pred_L0 |
| 12 | B_L0_Bi_16×8 | 2 | Pred_L0 | BiPred |
| 13 | B_L0_Bi_8×16 | 2 | Pred_L0 | BiPred |
| 14 | B_L1_Bi_16×8 | 2 | Pred_L1 | BiPred |
| 15 | B_L1_Bi_8×16 | 2 | Pred_L1 | BiPred |
| 16 | B_Bi_L0_16×8 | 2 | BiPred | Pred_L0 |
| 17 | B_Bi_L0_8×16 | 2 | BiPred | Pred_L0 |
| 18 | B_Bi_L1_16×8 | 2 | BiPred | Pred_L1 |
| 19 | B_Bi_L1_8×16 | 2 | BiPred | Pred_L1 |
| 20 | B_Bi_Bi_16×8 | 2 | BiPred | BiPred |
| 21 | B_Bi_Bi_8×16 | 2 | BiPred | BiPred |
| 22 | B_8×8 | 4 | na | na |

At 418, a determination is made whether the slice type and macroblock type are any of the combinations of P-slice, macroblock type 3, P-slice macroblock type 4, B-slice macroblock type 22. If the slice type and macroblock are not any of the foregoing combinations, the preprocessor 225 creates a data structure comprising four partition attributes, each partition attribute including a prediction type parameter and a block type parameter. The preprocessor 225 populates the prediction type parameters in each of the partitions with an intermediate parameter indicating the prediction type and the block type parameters in each of the partitions with an intermediate parameter indicating the block type (420).

If at 415, the slice type and macroblock are any one of the aforementionned combinations, the preprocessor 225 examines the symbols indicating the sub-macroblock type (425). In AVC, there are typically four symbols indicating the sub-macroblock type. The preprocessor 225 creates a data structure comprising four partition attributes, each partition attribute including a prediction type parameter and a block type parameter. The preprocessor 225 populates the prediction type and block type parameters of the first partition attribute with the intermediate symbols indicating a prediction type and block type associated with the first sub-macroblock type.

A table associating symbols describing sub-macroblock types associated with exemplary intermediate symbols describing prediction and block types is shown below. The preprocessor 225 populates the second, third, and fourth partition attributes with prediction type and block type parameters associated with the second, third, and fourth sub-macroblock types, respectively (430).

| sub_mb_type | Name of sub_mb_type | num_sub_mb_part (sub_mb_type) | sub_mb_pred_mode (sub_mb_type) |
|---|---|---|---|
| 0 | P_L0_8×8 | 1 | Pred_L0 |
| 1 | P_L0_8×4 | 2 | Pred_L0 |
| 2 | P_L0_4×8 | 2 | Pred_L0 |
| 3 | P_L0_4×4 | 4 | Pred_L0 |

| sub_mb_type | Name of sub_mb_type | num_sub_mb_part (sub_mb_type) | sub_mb_pred_mode (sub_mb_type) |
|---|---|---|---|
| 0 | B_Direct_8×8 | 1 | Direct |
| 1 | B_L0_8×8 | 1 | Pred_L0 |
| 2 | B_L1_8×8 | 1 | Pred_L1 |

-continued

| sub_mb_type | Name of sub_mb_type | num_sub_mb_part (sub_mb_type) | sub_mb_pred_mode (sub_mb_type) |
|---|---|---|---|
| 3 | B_Bi_8 × 8 | 1 | BiPred |
| 4 | B_L0_8 × 4 | 2 | Pred_L0 |
| 5 | B_L0_4 × 8 | 2 | Pred_L0 |
| 6 | B_L1_8 × 4 | 2 | Pred_L1 |
| 7 | B_L1_4 × 8 | 2 | Pred_L1 |
| 8 | B_Bi_8 × 4 | 2 | BiPred |
| 9 | B_Bi_4 × 8 | 2 | BiPred |
| 10 | B_L0_4 × 4 | 4 | Pred_L0 |
| 11 | B_L1_4 × 4 | 4 | Pred_L1 |
| 12 | B_Bi_4 × 4 | 4 | BiPred |

At 435, the preprocessor 225 prepends the data structure created, either during 420 or 430, with a macroblock mode parameter. The macroblock mode parameter is a collection of flags to further describe the current macroblock, indicating whether the current Macroblock is coded in the INTRA16×16 mode, the INTRA 4×4 mode, or contains DIRECT MV, wherein MV is derived from either a neighboring or co-located block of a first reference picture of the reference list 1. At 440, the preprocessor 225 appends the coded block pattern, followed by the MB_QP_Delta symbols. The foregoing data structure represents the parameters that can be handled by software.

At 442, the preprocessor 225 appends the data structure with the symbols associated with the hardware. The symbols associated with the hardware include either:

[INTRA_PRED_MODE 16][INTRA_PRED_CHROMA 1] [MB RESIDUAL]

or

[REF_ID_FW (1~4)][REF_ID_BW (1~4)][MVD_FW (1~16)×2] [MVD_BW (1~16)×2] [MB RESIDUAL]

The data structure including the intermediate symbols and the hardware symbols is represented by the following syntax:

MB_MODE MB_PARTITION_ATTRIBUTE [4] [CODED_BLOCK_PATTERN] [MB_QP_DELTA] [INTRA_PRED_MODE 16] [INTRA_PRED_CHROMA 4] [MB RESIDUAL]

or

MB_MODE MB_PARTITION_ATTRIBUTES[4] [CODED_BLOCK_PATTERN] [MB_QP_DELTA] [REF_ID_FW (1~4)] [REF_ID_BW (1~4)] [MVD_FW (1~16)×2][MVD_BW (1~16)×2][MB RESIDUAL]

At 445, the preprocessor 225 replaces the macroblock symbols 125 in the bitstream with the data structure that includes the intermediate symbols and hardware symbols, thereby resulting in an intermediate bitstream.

Figure 5:
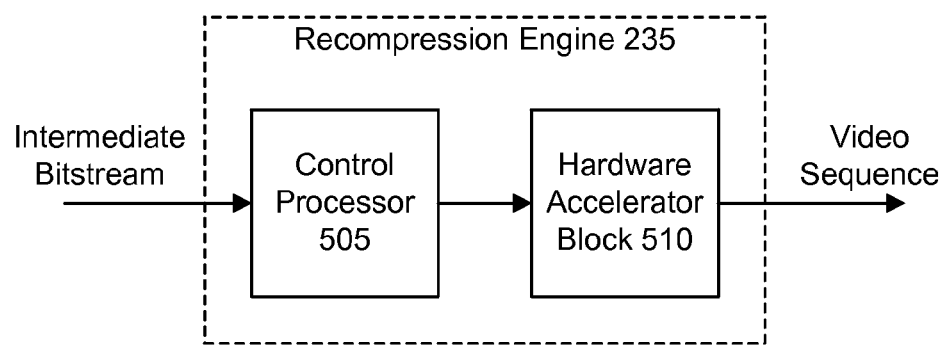
FIG. 5 is a block diagram of a decompression engine in accordance with an embodiment of the present invention.

Referring now to FIG. 5, there is illustrated a block diagram of the decompression engine 235, in accordance with an embodiment of the present invention. The decompression engine 235 receives the intermediate bitstream comprising macroblock symbols 125, intermediate symbols, and compressed video data. The decompression engine 235 decompresses the compressed video data resulting in a video sequence.

The decompression engine 235 comprises a control processor 505 and a hardware accelerator block 510. The control processor parses the intermediate symbols while the hardware accelerator block uses the hardware portion to decompress the video data.

The decoder system as described herein may be implemented as a board level product, as a single chip, application specific integrated circuit (ASIC), or with varying levels of the decoder system integrated on a single chip with other portions of the system as separate components. The degree of integration of the monitoring system will primarily be determined by speed of incoming data, and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device wherein the flow charts described herein can be implemented as instructions in firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A decoder for decoding a bitstream, the bitstream comprising symbols representing parameters and compressed data, said decoder comprising:
    a preprocessor for replacing one or more of the symbols representing the parameters with intermediate symbols representing the parameters, without losing any of the parameters; and
    a decompression engine for decompressing the compressed data based on the intermediate symbols.

2. The decoder of claim 1, further comprising:
    a system layer processor for receiving the bitstream.

3. The decoder of claim 1, further comprising:
    a compressed data buffer for storing the intermediate symbols and the compressed data.

4. The decoder of claim 1, wherein the bitstream comprises at least one macroblock, said macroblock comprising the symbols and the compressed data.

5. The decoder of claim 4, wherein the one or more of the symbols comprise numbers, and wherein the intermediate symbols comprise parameters indicating temporal prediction modes.

6. The decoder of claim 5, wherein the intermediate symbols comprise parameters indicating block sizes.

7. The decoder of claim 1, wherein the symbols comprise symbols indicating hardware parameters and symbols indicating software parameters, and wherein the preprocessor replaces the symbols indicating software parameters with the intermediate symbols and partitions the intermediate symbols from the symbols indicating hardware parameters.

8. The decoder of claim 7, wherein the decompression engine comprises:
    a control processor for parsing the intermediate symbols; and
    a hardware block accelerator for parsing the symbols.

9. The decoder of claim 1, wherein the decompression engine losslessly decodes the intermediate symbols.

10. A method for decoding a bitstream, the bitstream comprising symbols representing parameters and compressed data, said method comprising:
    replacing one or more of the symbols representing the parameters with intermediate symbols representing the parameters, without losing any of the parameters; and
    decompressing the compressed data based on the intermediate symbols.

11. The method of claim 10, further comprising:
   storing the intermediate symbols and the compressed data.

12. The method of claim 10, wherein the bitstream comprises at least one macroblock, said macroblock comprising the symbols and the compressed data.

13. The method of claim 12, wherein the one or more of the symbols comprise numbers, and wherein the intermediate symbols comprise parameters indicating temporal prediction modes.

14. The method of claim 12, wherein the intermediate symbols comprise parameters indicating block sizes.

15. The method of claim 10, wherein the symbols comprise symbols indicating hardware parameters and symbols indicating software parameters, further comprising:
   replacing the symbols indicating software parameters with the intermediate symbols; and
   partitioning the intermediate symbols from the symbols indicating hardware parameters.

\* \* \* \* \*